United States Patent [19]

Terai

[11] Patent Number: 5,322,299
[45] Date of Patent: Jun. 21, 1994

[54] METAL GASKET

[76] Inventor: Toshimitsu Terai, 27-10, Honmachi 6-chome, Shibuya-ku, Tokyo, Japan

[21] Appl. No.: 132,155

[22] Filed: Sep. 30, 1993

Related U.S. Application Data

[63] Continuation of Ser. No. 457,783, Jan. 10, 1990, abandoned.

[30] Foreign Application Priority Data

May 27, 1988 [JP] Japan .................... 63-128476
Apr. 26, 1989 [JP] Japan .................... 1-104730

[51] Int. Cl.⁵ .............................. F16J 15/32
[52] U.S. Cl. ...................... 277/235 B; 277/207 R; 277/209; 277/227
[58] Field of Search ............ 277/235 B, 209, 211, 277/227, 235 A, 207 R, 207 A

[56] References Cited

U.S. PATENT DOCUMENTS

| | | | |
|---|---|---|---|
| 1,851,948 | 3/1932 | Summers | 277/211 |
| 3,473,813 | 10/1969 | Meyers et al. | 277/235 B X |
| 3,477,867 | 11/1969 | Hillier | 277/235 B X |
| 3,737,169 | 6/1973 | Glynn | 277/235 B |
| 3,909,019 | 9/1975 | Leko | 277/209 |
| 4,140,323 | 2/1979 | Jacobs | 277/235 B X |
| 4,272,085 | 6/1981 | Fujikawa et al. | 277/235 B |
| 4,428,593 | 1/1984 | Pearlstein | 277/235 B |
| 4,516,784 | 5/1985 | Merz | 277/235 B X |
| 4,625,979 | 12/1986 | Inciong | 277/227 X |
| 4,721,315 | 7/1988 | Ueta | 277/235 B |
| 4,743,421 | 5/1988 | McDowell et al. | 277/235 B X |
| 4,776,073 | 10/1988 | Udagawa | 277/235 B X |

FOREIGN PATENT DOCUMENTS

| | | | |
|---|---|---|---|
| 977382 | 11/1975 | Canada | 277/235 B |
| 3523151 | 1/1987 | Fed. Rep. of Germany | 277/235 B |
| 49-12513 | 3/1974 | Japan . | |
| 51-139859 | 11/1976 | Japan . | |
| 58-38194 | 8/1983 | Japan . | |
| 60-92745 | 6/1985 | Japan . | |
| 61-255250 | 11/1986 | Japan . | |
| 62-261755 | 11/1987 | Japan . | |
| 62-261757 | 11/1987 | Japan . | |
| 63-149479 | 6/1988 | Japan . | |
| 63-112261 | 7/1988 | Japan . | |
| 710392 | 6/1954 | United Kingdom | 277/235 B |
| 926089 | 5/1963 | United Kingdom | 277/209 |
| 12686333 | 3/1972 | United Kingdom . | |

*Primary Examiner*—William A. Cuchlinski, Jr.
*Assistant Examiner*—Daniel G. DePumpo
*Attorney, Agent, or Firm*—Armstrong, Westerman, Hattori, McLeland & Naughton

[57] ABSTRACT

The present invention is a metal gasket for sealing a gas, liquid, etc. The metal gasket has a planar base (10) formed from a metal plate, and surface pressure generating materials (A) and (B) are attached to the obverse and reverse surfaces of the base (10) at the outer periphery of a hole in the base (10) which is to be sealed in such a manner that the positions of the attached surface pressure generating materials (A) and (B) are offset from each other. When the base (10) is clamped from both sides thereof, it is elastically deformed by being pressed through the surface pressure generating materials (A) and (B), thus generating surface pressure.

14 Claims, 10 Drawing Sheets

$t_1 < t_0 \qquad \ell_1 > \ell_2$ $\theta_1 < \theta_2$

METAL GASKET

This application is a continuation of application Ser. No. 07/457,783 filed Jan. 10, 1990, now abandoned.

TECHNICAL FIELD

The present invention relates to a metal gasket. More particularly, the present invention relates to a metal gasket for making gas-tight joints, for example, between the cylinder head of an internal combustion engine and the cylinder block or between the joint surfaces of pipe flanges, and maintaining the gas-tightness for a long period of time.

BACKGROUND ART

Asbestos gaskets, metallic gaskets, and gaskets formed by laminating asbestos and metallic materials have heretofore been known as engine cylinder head gaskets and gas sealing gaskets for turbochargers. Particularly, gaskets for engine cylinder heads are required to improve the sealing performance upon demand for reduction in the size and weight of engines. To satisfy the requirement for the performance, metal gaskets have recently been used.

To improve the sealing performance of the metal gaskets, various structures have heretofore been proposed. As one example of these metal gasket structures, Japanese Utility Model Application Laid-Open Publication (KOKAI) No. 57-59952 (JP, U, 57-59952) discloses a gasket wherein a gasket base is elastically deformed to form a plurality of corrugate projections at the outer periphery of a combustion chamber, that is, a gasket provided with beads. The gasket is pressed from both sides of the beads, thereby deforming the beads, and thus improving the sealing performance by making use of the restitution of the deformed beads.

This gasket has excellent sealing performance. However, although the sealing performance is improved, when the gasket is clamped from both sides thereof, the beads are deformed into a flat surface and, at this time, stress concentrations occur at the angular portions of the beads. During use of the gasket for a long period of time, the metal constituting the portions having stress concentrations is fatigued by vibrations caused by explosion in the engine and this fatigue of the metal may cause breakage or weaken the elastic restoring force even if the gasket is not broken. In addition, the gasket needs a bending process to form corrugate beads in manufacture. The bending process causes work hardening and strain in the gasket base, thus the base being weakened in terms of the metallographic structure. It is also necessary to prepare a press die for the bending process.

Japanese Utility Model Application Laid-Open Publication (KOKAI) No. 60-18247 (JP, U, 60-18247) discloses a metal gasket made from a steel plate wherein beads which are in the form of recesses and projections, that is, annular grooves, are formed on both surfaces of the metal gasket so as to surround a water hole and the annular grooves are coated with a sealing material consisting essentially of a silicone resin.

This gasket needs a bending process to form beads in the same way as in the case of the above-described gasket. This gasket is a water hole gasket for waterproof sealing and has no idea for sealing engine cylinder bores that are exposed to high-temperature flame heat. In the foregoing prior arts, when the cylinders of an engine and the cylinder head, for example, are clamped by means of bolts with a gasket being interposed therebetween, the gasket is compressed unevenly, resulting in the sealing effectiveness varying depending upon the position on the gasket.

In general, gaskets have a tendency to be clamped in such a manner that the bolted portions and vicinities are strongly clamped, and the remoter therefrom, the lower the level of clamping force. This is due to the deformation of the cylinders and the cylinder head. Since cylinders and cylinder heads of engines which are reduced in size and weight as in recent years have a tendency to be reduced in the wall thickness, uneven deformation is unavoidable.

DISCLOSURE OF INVENTION

The present invention was made with the foregoing technical background to attain the following objects.

An object of the present invention is to provide a metal gasket which has an extremely simple structure and yet exhibits high sealing effectiveness.

Another object of the present invention is to provide a metal gasket which is capable of sealing with uniform surface pressure.

Still another object of the present invention is to provide a metal gasket in which stress concentration is unlikely to occur.

A further object of the present invention is to provide a metal gasket which is capable of completely sealing an internal pressure gas with a weak surface pressure.

A still further object of the present invention is to provide a metal gasket which has excellent heat resistance.

A still further object of the present invention is to provide a metal gasket which is designed so that the adherability of a surface pressure generating material to the surface of the gasket base is improved.

It is an advantageous effect of the present invention that the manufacture is simple because sealing materials are simply coated in offset relation to each other on both surfaces of a gasket base which is in the form of a flat plate.

It is another advantageous effect of the present invention that the adhesion of a sealing material or a surface pressure generating material is improved simply by coating the sealing or surface pressure generating material on both surfaces of a gasket base after these surfaces have been roughened.

The main subject matter of the present invention to attain the above-described objects and advantageous effects is a metal gasket comprising: a planar base which is a metal plate provided with a necessary hole and having two parallel surfaces; and surface pressure generating materials provided on the obverse and reverse surfaces, respectively, of the base at the outer periphery of the hole to be sealed in such a manner that the widthwise center positions of the surface pressure generating materials are spaced apart from each other.

It is more effective to partially or entirely roughen the surfaces of the base to which the surface pressure generating materials are attached with a view to enhancing the effectiveness of adhesion of the surface pressure generating materials. In addition, if the obverse and reverse surfaces of the base are entirely coated with a sealing material, the sealing performance is further improved.

Best Mode for Carrying Out the Invention

Embodiments 1—1 to 1-6

Figure 1:
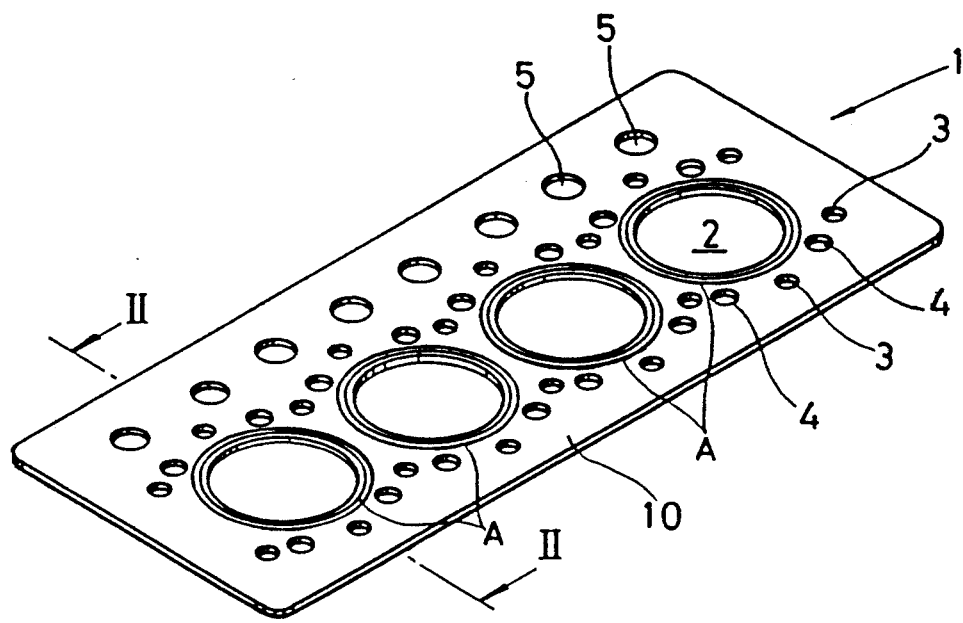
FIG. 1 is a general view of a metal gasket according to Embodiment 1—1 of the present invention.

The best embodiments of the present invention will be described below with reference to the drawings. The metal gasket 1 shown in FIG. 1 is Embodiment 1—1 in which the present invention is applied to a gasket for an automotive engine and in which the metal gasket 1 is interposed between a cylinder head and cylinders. In this embodiment, the metal gasket 1 has four cylinder bores 2, a plurality of bolt holes 3, water holes 4 and oil holes 5. The cylinder bores 2 have substantially the same diameter as that of the combustion chambers of the engine and correspond to the respective combustion chambers. The bolt holes 3 are adapted for passing bolts to secure the cylinders to the cylinder head.

The water holes 4 are adapted to pass cooling water for cooling the engine. The oil holes 5 are adapted to pass a lubricating oil for lubrication. The base 10 is a resilient metal plate. As a material for the metal plate, although there are a variety of known materials, any heat-resistant and resilient material may be employed, for example, a heat-resistant alloy, steel plate (SS material), clad metal (SK), stainless steel (SUS), etc. The base 10 is formed by a known machining means, for example, blanking, laser cutting, etc.

Figure 2:
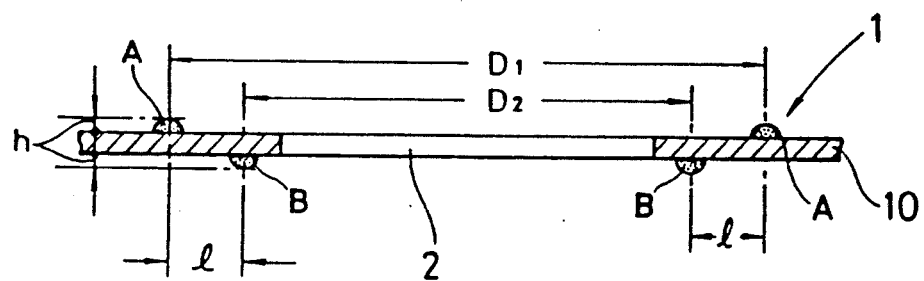
FIG. 2 is a sectional view taken along the line II—II of FIG. 1.

FIG. 2 is a sectional view taken along the line II—II of FIG. 1. A sealing material A having a diameter $D_1$ is attached to the outer periphery of the cylinder bore 2 in the gasket 1. The sealing material A is coated in the shape of a semicircle or a rectangle in the cross-section. As a material for the sealing material A, a known material, for example, a silicone rubber, a fluorine-contained rubber or resin, is used. In addition, a sealing material B having a diameter $D_2$ is attached to the surface reverse to the surface having the sealing material A attached thereto in concentric relation to the sealing material A and at the inner periphery of it. The positions of the sealing materials A and B are offset from each other by a distance $\iota$ in the radial direction.

The sealing materials A and B in this embodiment have sealing properties. However, the sealing properties are not necessarily needed, and any material which is capable of deforming the base 10 to thereby generate surface pressure may be employed, as described later. However, if the surface pressure generating material has both elasticity and sealing properties as in this embodiment, it is further possible to ensure the sealing performance and the performance of following up the deformation of the base 10 under low surface pressure. It should be noted that the sealing performance can be ensured at the side of the gasket body which is reverse to the side where the surface pressure generating material is provided. Accordingly, "sealing material" is herein synonymous with "surface pressure generating material".

The coating thickness h of each of the sealing materials A and B from the corresponding surface of the gasket 1 may be varied depending upon the circumferential position thereof. This is because, when the cylinder head and the cylinders are clamped by means of bolts, the gap therebetween varies depending upon the circumferential position, as described above: the closer to the bolts, the higher the level of clamping force and the smaller the gap; the remoter from the bolts, the greater the gap. Since the level of pressure with which the cylinder head is clamped by means of bolts has previously been set as being a designed pressure, the amount of gap described above can be measured.

Figure 3A:
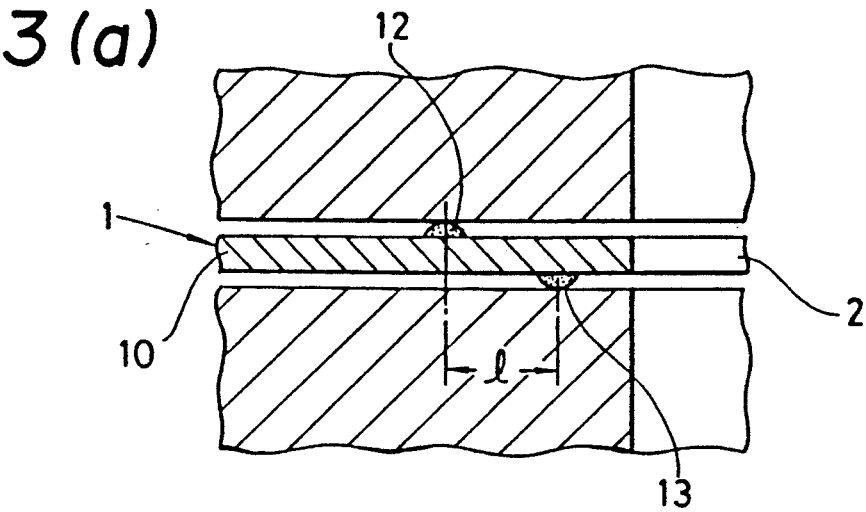
FIGS. 3(a), 3(b) and 3(c) are sectional views showing the process of deformation of a metal gasket by a clamping operation.
Figure 3B:
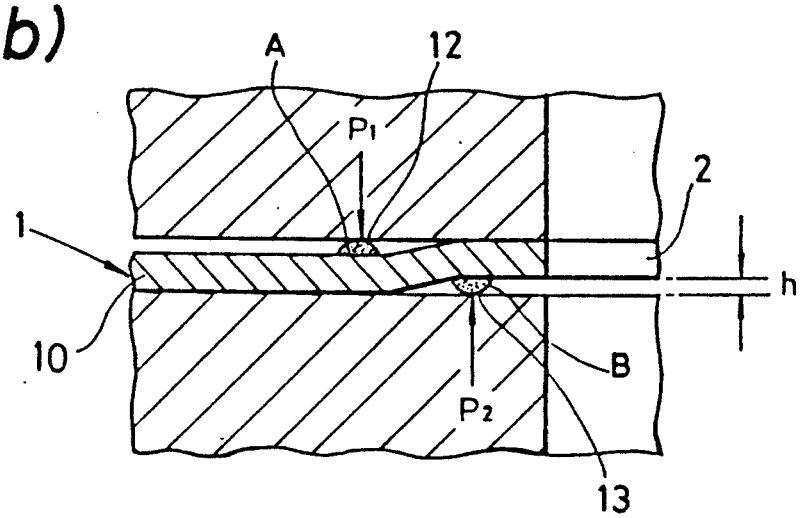
Figure 3C:
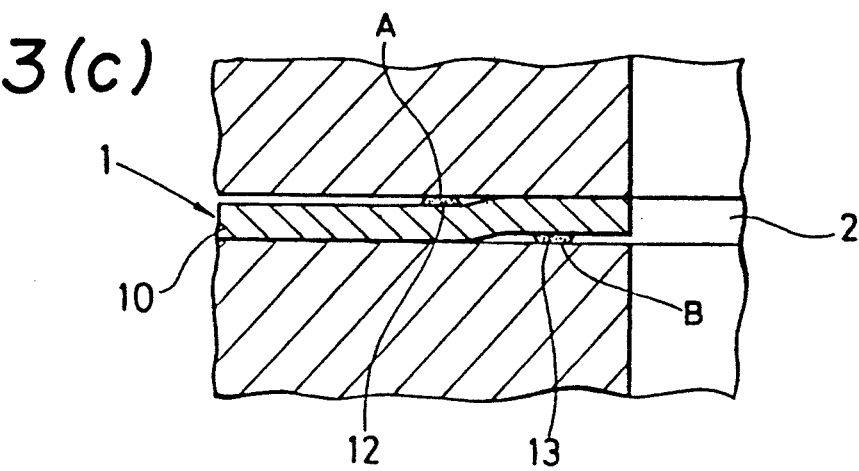

In accordance with the size of the gap, the coating thickness h of the sealing materials A and B is adjusted and varied in accordance with the distance from each clamping bolt. However, the sealing materials A and B may have a constant coating thickness in use applications where no strictness is demanded. FIGS. 3(a), 3(b) and 3(c) are sectional views showing the process of deformation of the gasket 1 when the cylinder head and the cylinders are clamped by means of cylinder head clamping bolts. FIG. 3(a) shows the state at the time of starting the clamping operation, FIG. 3(b) shows the state in the middle of the clamping operation, and FIG. 3(c) shows the state at the time of completion of the clamping operation. Counterforces $P_1$ and $P_2$ from the points 12 and 13 of contact of the sealing materials A and B act in such a manner as to push the base 10, thus causing the base 10, which is a flat plate, to be deformed into a partially curved plate against the elastic force therefrom.

Since the base 10 is made from a metal plate having spring rigidity, counterforces are produced from the inside of the base 10 so as to resist the deformation. These counterforces cause action and reaction between the base 10 on the one hand and the cylinder head and the cylinders on the other in such a manner that these members push against each other, thus enabling the cylinder head and the cylinders to be hermetically sealed. Since the thicknesses of the sealing materials A and B have been predetermined in accordance with the level of counterforce to the clamping force, clamping can be effected with uniform surface pressure.

Figure 4:
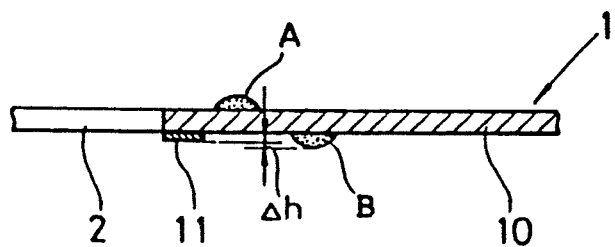
FIG. 4 is a sectional view showing Embodiment 1-2 in which a fire guard is provided.
Figure 5:
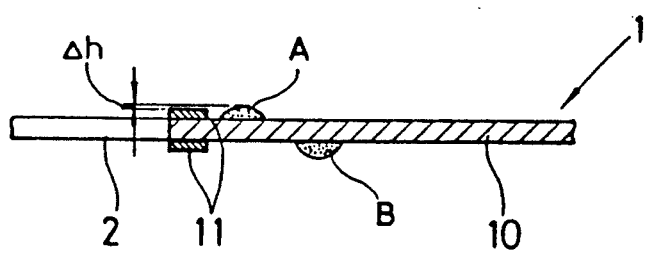
FIG. 5 is a sectional view showing Embodiment 1-3 in which a fire guard is provided.
Figure 6:
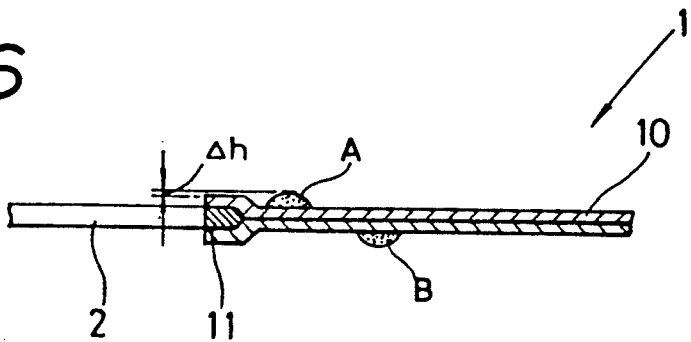
FIG. 6 is a sectional view showing Embodiment 1-4 in which a fire guard is provided.

FIG. 4 shows Embodiment 1-2 in which a fire guard 11 is provided on the base 10 at the side thereof which is closer to the combustion chamber 2 to protect the base 10 from flames from the combustion chamber 2. The fire guard 11 is provided only on a part of one side of the base 10. The fire guard 11 is formed from a material which has excellent high-temperature resistance by a known means, for example, plating, spraying, welding of metal plate, sintering, etc. The height of the sealing material B is greater than that of the fire guard 11 by $\Delta h$. Since the fire guard 11 is not deformed when the base 10 is clamped from both sides thereof, the portion corresponding to the height $\Delta h$ alone functions as an interference. FIG. 5 shows Embodiment 1-3 in which the fire guard 11 is provided on each of the obverse and reverse sides of the gasket base 10. FIG. 6 shows Embodiment 1-4 in which the base 10 comprises two plates and is provided with the fire guard 11 which is inserted into the middle thereof in the thicknesswise direction.

In the foregoing Embodiments 1—1 to 1-4, the sealing materials A and B are coated on the obverse and reverse sides, respectively, of the base 10 at the outer periphery of the cylinder bore 2 in concentric relation to it. As has been described above, bolts are inserted into the bolt holes 3, respectively, to clamp together the cylinders and the cylinder head. The clamping force acting between the cylinders and the cylinder head is strong around each bolt, and the remoter from each bolt, the lower the level of the clamping force. This is because the cylinders and the cylinder head are deformed. The amount of deformation is determined when the bolt tightening force is determined.

Figure 7:
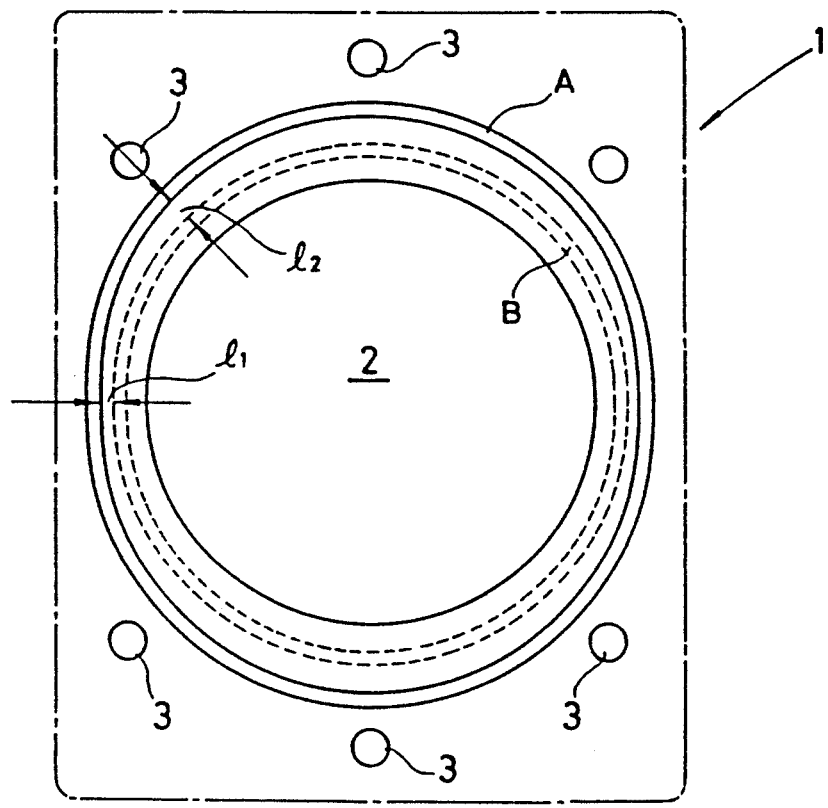
FIG. 7 is a sectional view showing Embodiment 1-5 in which the spacing between sealing materials is varied.

FIG. 7 shows Embodiment 1-5 in which the spacing between the sealing materials A and B in the radial direction of the cylinder bore 2 is proportioned in accordance with the change in the amount of deformation. At a position which is remote from a bolt hole 3, the spacing is set at a relatively short distance $\iota_1$, whereas, at a position which is closer to a bolt hole 3, the spacing is set at a relatively long distance $\iota_2$. More specifically, the position of the sealing material A is proportioned so that the condition of $\iota_1 < \iota_2$ is satisfied. In this embodiment, the sealing material B is positioned so as to define a concentric circle with respect to the cylinder bore 2. However, the arrangement may be such that the sealing material A is provided so as to be concentric with the cylinder bore 2 and the sealing material B, which is closer to the cylinder bore 2, is proportioned in the distance between the same and the sealing material A. When no distance can be provided therebetween due to design, the thickness of each sealing material may be proportioned.

Figure 8:
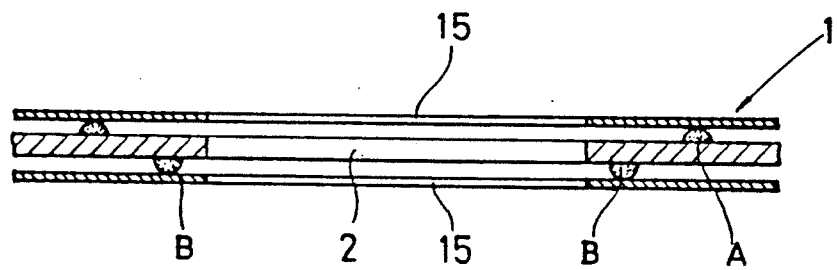
FIG. 8 is a sectional view of Embodiment 1-6 which shows another example of use.

FIG. 8 shows Embodiment 1-6 in which the metal gasket 1 is sandwiched between soft steel plates 15 which are provided over the upper and lower sides, respectively, of the gasket 1. When the soft steel plates 15 are incorporated into the engine, together with the metal gasket 1, the steel plates 15, which are soft, are elastically deformed and enter the spaces defined by tool marks (caused by the coarseness of the loci of cutting and grinding tools) formed in the cylinder head and the cylinders. Accordingly, even if the cylinders and the cylinder head thermally expand and contract, there is no fear of the sealing materials A and B being deformed by being cut or scraped off by the tool marks.

Embodiments 2-1 to 2-6

The sealing materials A and B in the foregoing embodiments are attached directly to the base 10 of the metal gasket 1. There are, however, cases where the sealing materials A and B do not sufficiently adhere to the base 10, depending upon the material thereof. The following embodiments are designed to improve the adherability.

Figure 9:
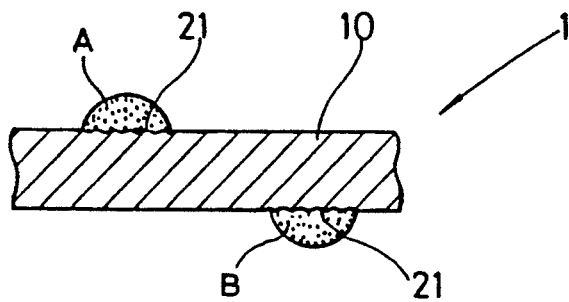
FIG. 9 is a sectional view showing Embodiment 2-1 in which the base is provided with roughened surfaces.

FIG. 9 is an enlarged view of a portion including the sealing materials A and B, which shows Embodiment 2-1 in which roughened surfaces 21 are formed on the surfaces of the base 10 of the metal gasket 1. The roughened surfaces 21 are formed so as to be higher in the degree of unevenness than the other portions of the surfaces of the base 10. More specifically, the roughened surfaces 21 are surface portions having minute geometric deviations from a geometrically ideal surface, which is generally known as roughness. Roughness is defined by irregularities which are formed on a surface at smaller intervals than the depth to such an extent that they are recognizable by the sense of touch and visible to the naked eye (about 5 to $15\mu$ in this embodiment).

The roughened surfaces 21 may be formed by a known machining method, for example, sandblast, shot peening, electroplating, chemical etching, etc. The roughened surfaces 21 are formed only at the portions where the sealing materials A and B are to be attached. Thus, the adhesion between the sealing materials A, B and the base 10 increases.

Figure 10:
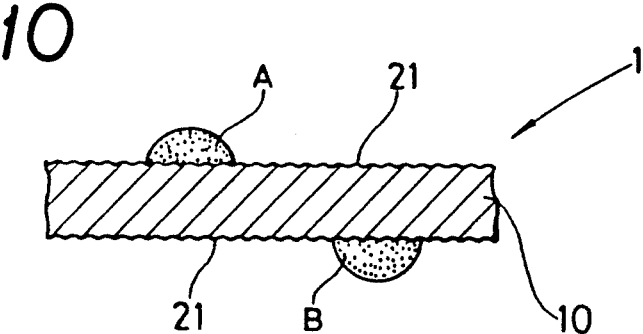
FIG. 10 is a sectional view showing Embodiment 2-2 in which the base is provided with roughened surfaces.
Figure 11:
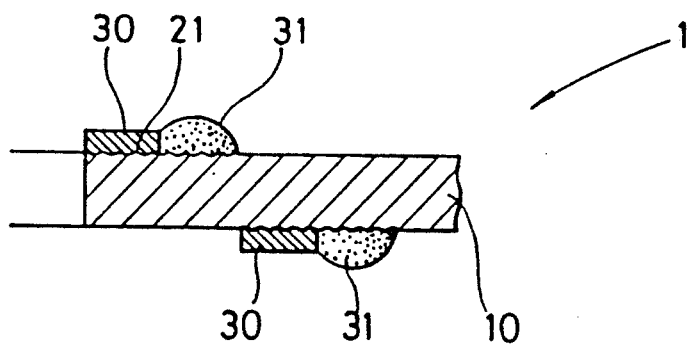
FIG. 11 is a sectional view showing Embodiment 2-3 in which the base is provided with roughened surfaces.

FIG. 10 shows Embodiment 2—2 in which roughened surfaces 21 are provided all over the surfaces of the base 10 by means of satinizing. Since this base 10 is not partially machined, machining of the roughened surfaces 21 is easier than in the case of the foregoing embodiment. FIG. 11 shows Embodiment 2-3 which employs a rigid surface pressure generating material 30 and a soft surface pressure generating material 31. The rigid surface pressure generating material 30 is herein formed by means, for example, of plating, spraying or sintering. The rigid surface pressure generating material 30 has a rectangular cross-sectional configuration. The soft surface pressure generating material 31 is formed from a non-metallic material such as a resin, silicone, rubber, etc.

Figure 12:
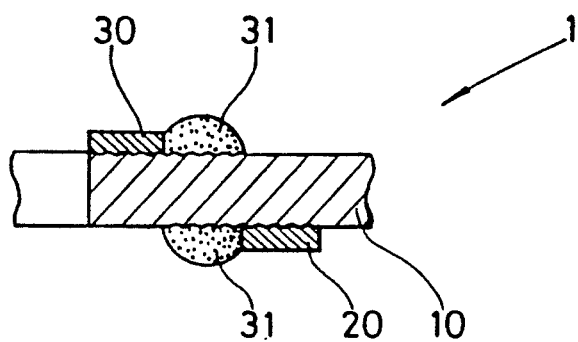
FIG. 12 is a sectional view showing Embodiment 2-4 in which the base is provided with roughened surfaces.

In this embodiment, since the rigid surface pressure generating material 30 is used, the amount of deformation of the rigid surface pressure generating material 30 is small even when the cylinder head and the cylinders are clamped together; therefore, the rigid surface pressure generating material 30 serves as a stopper. Accordingly, the amount of soft surface pressure generating material 31 necessary to use is small. Even if the base 10 is so thick that it is not readily deformed, the rigid surface pressure generating material 30 enables deformation of the base 10. In addition, since the rigid surface pressure generating material 30 is used in combination with the soft surface pressure generating material 31, it is possible to draw out the advantages of both the surface pressure generating materials 30 and 31. FIG. 12 shows Embodiment 2-4 in which a rigid surface pressure generating material 30 and a soft surface pressure generating material 31 are used in combination in the same way as in the foregoing modification.

Figure 13:
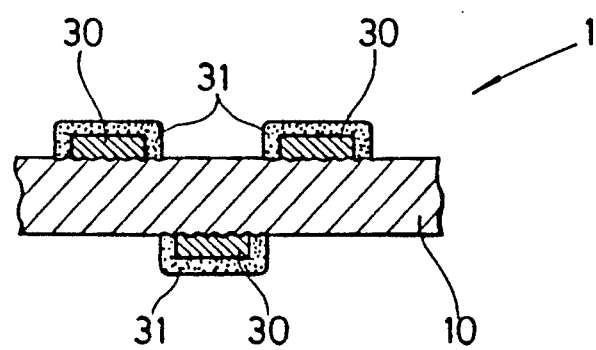
FIG. 13 is a sectional view showing Embodiment 2-5 in which the base is provided with roughened surfaces.
Figure 14:
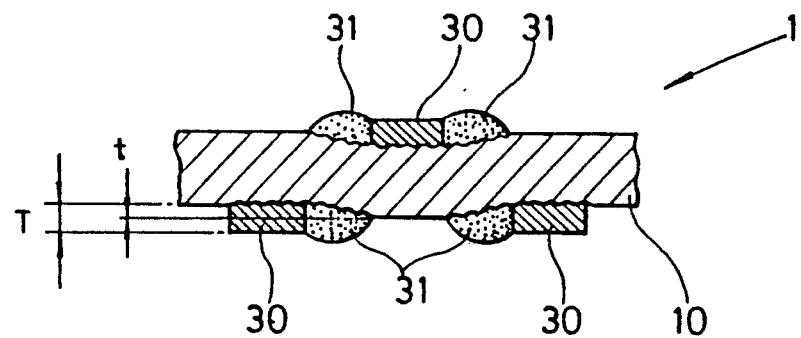
FIG. 14 is a sectional view showing Embodiment 2-6 in which the base is provided with roughened surfaces.

In Embodiment 2-4, the soft surface pressure generating material 31 is disposed on each side of the base 10 in such a manner that the material 31 provided on the obverse surface and that on the reverse surface sandwich the base 10. In comparison with the foregoing embodiment, this embodiment is effective when the sealing area is narrow. FIG. 13 shows Embodiment 2-5 in which a rigid surface pressure generating material 30 and a soft surface pressure generating material 31 are similarly used in combination in such a manner that the surface of the rigid surface pressure generating material 30 is covered with the soft surface pressure generating material 31. The outer surface of the rigid surface pressure generating material 30 having a rectangular cross-sectional configuration is covered with the soft surface pressure generating material 31. FIG. 14 shows Embodiment 2-6 in which a rigid surface pressure generating material 30 and a soft surface pressure generating material 31 are similarly used in combination. This is used in a case where the sealing area is further narrower than in the case of the foregoing embodiment. The base 10 in Embodiment 2-6 has been slightly bent in advance so as to protrude as illustrated, thus forming a step t. This step t is, however, not formed by deforming the base 10 to a substantial extent as in the prior art, and it is not intended to utilize the step t positively to generate surface pressure. A rigid surface pressure generating material 30 is formed to a thickness T which is greater than the step t. A soft surface pressure generating material 31 is attached to the side surface of the rigid surface pressure generating material 30. This arrangement is to prevent the sealing surface of a cylinder or the cylinder head from being damaged by the edge of the base 10 slanted due to deformation during the clamping operation. The base 10 may be flat, as a matter of course.

Embodiments 3-1

Figure 15A:
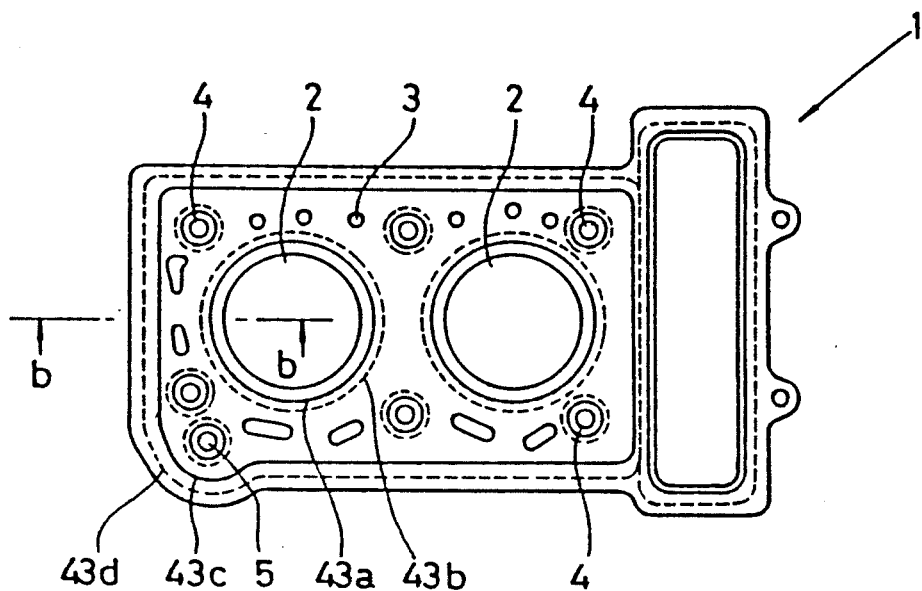
FIG. 15(a) is a plan view showing the general structure of Embodiment 3-1 of another metal gasket to which the present invention is applied.
Figure 15B:
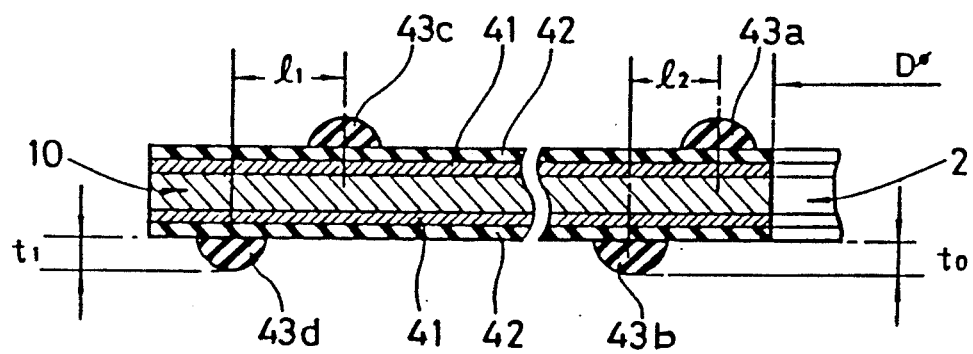
FIG. 15(b) is a sectional view taken along the line b—b of FIG. 15(a).

The metal gasket 1 shown in FIGS. 15(a) and 15(b) is Embodiment 3 in which the present invention is applied to a gasket for an automotive gasoline engine. In this embodiment, the gasket 1 has two cylinder bores 2, water holes 3, bolt holes 4, oil holes 5, etc. Each cylinder bore 2 corresponds to a combustion chamber of the engine. The bolt holes 4 are adapted for passing bolts to secure the cylinders to the cylinder head. The water holes 3 are adapted to pass cooling water for cooling the engine.

The oil holes 5 are adapted to pass a lubricating oil for lubrication. FIG. 15(b) is a sectional view taken along the line b—b of FIG. 15(a). Both the obverse and reverse surfaces of the base 10 are coated with a primer 41 for the purpose of satisfactorily bonding a sealing material to the base 10. A sealing material 42 having a high gas sealing performance is uniformly bonded, that is, laminated, over the primer 41 by means of coating or laminating. The primer 41 preferably has adhesion to both the material of the base 10 and the sealing material 42. Although many synthetic resins are known as those usable for primer coating purposes, a material for the primer 41 is selected and determined on the basis of the relationship between the sealing material 42 and the material of the base 10 which are selected. However, the primer 41 is not necessarily needed in practice because it is merely provided for the purpose of improving the adhesion of the sealing material 42 to the base 10.

The sealing material 42 consists essentially of a resin having sealing properties and excellent oil resistance and heat resistance, which is selected from among ① nitrile rubber (NBR), ② silicone rubber, ③ fluorine-contained rubber, ④ Teflon resin and ⑤ fluorine-contained resin. The sealing material 42 may be a mixture of the above-mentioned materials. The sealing material 42 in this embodiment differs in function from the sealing material in the foregoing embodiments. The sealing material 42 does not serve to generate surface pressure but mainly serves to improve the sealing performance. Surface pressure generating materials 43a, 43b, 43c and 43d are attached to the upper side of the sealing material 41 along the outer peripheries of the corresponding bores, that is, the cylinder bores 2, the oil holes 5, the water holes 3, etc.

The surface pressure generating material 43a is concentrically attached along the outer periphery of each cylinder bore 2. The surface pressure generating materials 43b are provided on the reverse surface of the base 10. Each surface pressure generating material 43b is located at the outer side of the corresponding surface pressure generating material 43a as viewed from the center of the corresponding cylinder bore 2. More specifically, the center position of the surface pressure generating material 43a is offset from that of the surface pressure generating material 43b by a distance $\iota_2$ in the radial direction of the cylinder bore 2. The surface pressure generating materials 43c and 43d are attached to the obverse and reverse surfaces, respectively, of the base 10 along the outer periphery thereof in the same way as the above. The distance between these surface pressure generating materials is $\iota_1$. The relationship between the two distances is $\iota_1 > \iota_2$.

Figure 16:
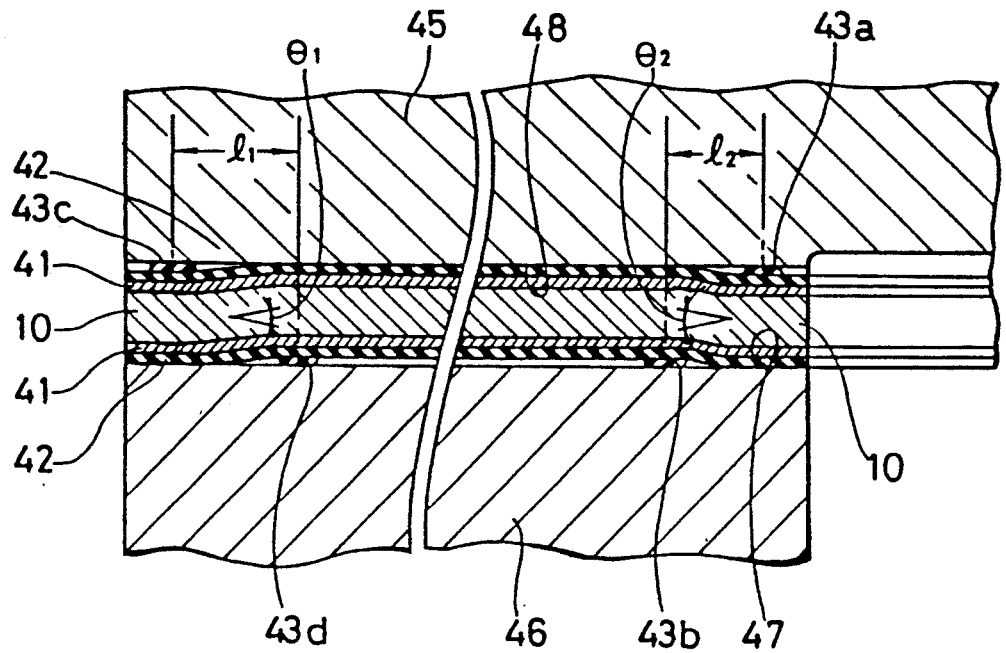
FIG. 16 is a sectional view showing the way in which the metal gasket of Embodiment 3-1 is deformed in use.

This is due to the following reason. The cylinder bores 2 are, as a matter of course, required to be more gas-tight than the other holes from the viewpoint of the operation of the internal combustion engine. Therefore, the surface pressure generating materials 43a and 43b are disposed closer to each other, i.e., at the distance $\iota_2$. When a cylinder 46 and a cylinder head 45 are clamped together by means of clamping bolts with the metal gasket 1 interposed therebetween, the surface of each surface pressure generating material, which is soft, is first deformed (see FIG. 16).

When pressure is applied to the upper side of the surface pressure generating material 43a from the joint surface 48 of the cylinder head 45, downward force acts on the base 10. At the same time, pressure is applied toward the surface pressure generating material 43b from the joint surface 47 of the cylinder 46, thus causing bending stress to act on the base 10. Since the surface pressure generating materials 43a and 43b have excellent rubber elasticity, the load applied to the base 10 will not concentrate. The bending angle of the base 10 is relatively large for the distance $\iota_2$ and relatively small for the distance $\iota_1$. More specifically, the angle $\theta_2$ is relatively large and the angle $\theta_1$ is relatively small in the example shown in FIG. 16.

The fact that the angle is large also means that the bending stress that acts on the base 10 is large. The counterforces to the bending stress cause action and reaction between the cylinder head 45 and the cylinder 46, thus bringing these two members into close contact with each other. Therefore, the gas sealing effectiveness is enhanced. Further, since in this embodiment the sealing materials 42 are coated or laminated over the obverse and reverse surfaces of the base 10, the sealing materials 42 come into close contact with the joint surface 48 of the cylinder head 45 and the joint surface 47 of the cylinder 46, respectively, thus further improving the sealing performance.

Figure 17:
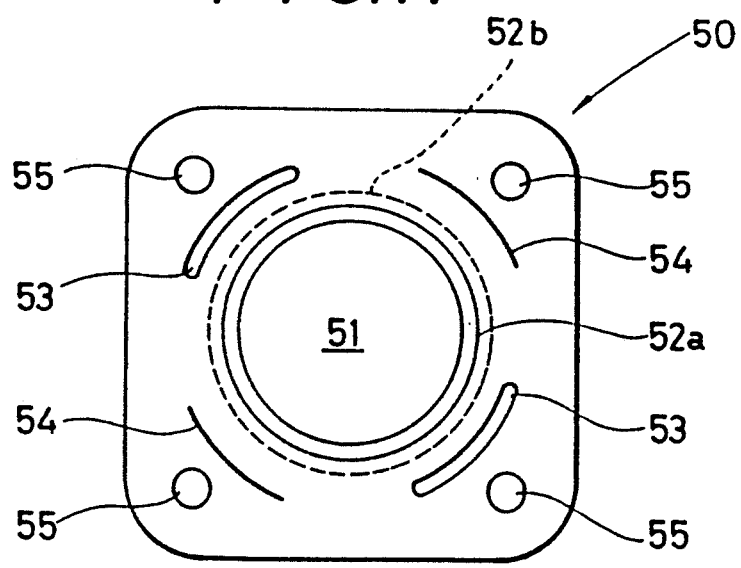
FIG. 17 is a plan view showing Embodiment 3-2 in which the metal gasket is provided with slits.

FIG. 17 shows Embodiment 3-2 in which a metal gasket 50 has slits or punched holes provided in the vicinities of bolt holes, respectively. A surface pressure generating material 52a is attached along the outer periphery of a cylinder bore 51. The metal gasket 50 has a surface pressure generating material 52b attached to the reverse surface thereof at the outer periphery of the surface pressure generating material 52a. Two slits 54 and two punched holes 53 are formed on the same circumference which is at the outer periphery of the surface pressure generating material 52b in such a manner that the slots 54 and the holes 53 are in opposing relation to each other. Further, a bolt hole 55 is bored at the outer periphery of each of the slits 54 and punched holes 53. In this embodiment, deformation caused by the bolt tightening pressure is absorbed by the slits 54 and the punched holes 53 and therefore is unlikely to reach the vicinity of the cylinder bore 51.

Figure 18:
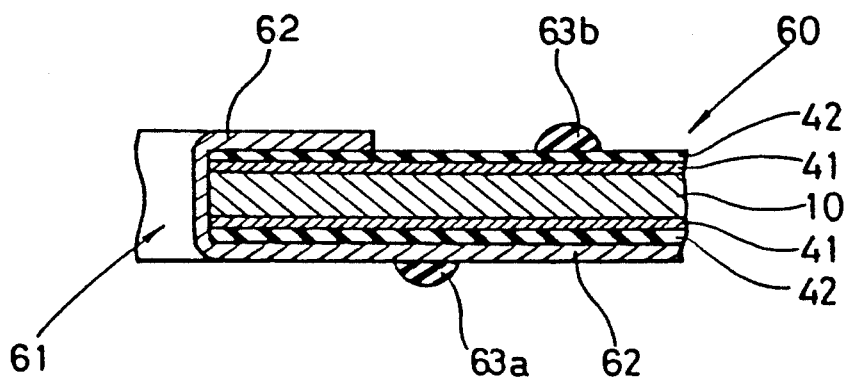
FIG. 18 is a sectional view showing Embodiment 3-3 in which the metal gasket is covered with a grommet.

FIG. 18 shows Embodiment 3—3 in which a metal gasket 60 is covered with a grommet 62. The grommet 62 is made of a material such as Spiegeleisen (SP), stainless steel (SUS), copper (Cu), etc. The portion of the base 10 which faces a cylinder bore 61 is exposed to high-temperature combustion gas. The grommet 62 prevents the base 10, the primers 41 and the sealing materials 42 from damage by the combustion gas. The grommet 62 is not bonded to the sealing material 42. The grommet 62, which has a plate-like shape, is merely placed on the surface of one sealing material 42 and bent at one end thereof which faces the cylinder bore 61 in the shape of a U, thus defining a bent portion 64.

A surface pressure generating material 63a is attached to the surface of the grommet 62. A surface pressure generating material 63b is attached to the surface of the sealing material 42 on the side reverse to the side where the surface pressure generating material 63a is provided. The grommet 62 is deformed when the cylinder and the cylinder head are clamped together, and thereby secured.

Figure 19:
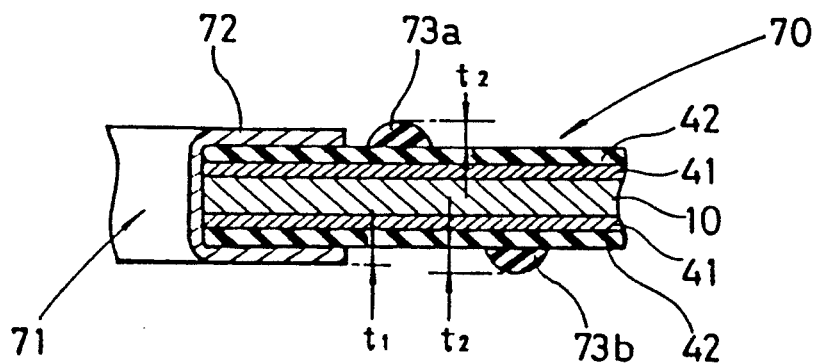
FIG. 19 is a sectional view showing Embodiment 3-4 in which the metal gasket is covered with a grommet.

FIG. 19 shows Embodiment 3-4 in which a grommet 72 is attached at a position which faces a cylinder bore 71 in the same way as in the foregoing embodiment. The grommet 72 is provided only at a portion which faces the cylinder bore 71. The grommet 72 is an annular member having a U-shaped cross-sectional configuration. Surface pressure generating materials 73a and 73b are disposed on the respective surfaces of the sealing materials 42 while being spaced apart from each other in the same way as the above. The height $t_2$ of each of the surface pressure generating materials 73a and 73b is greater than the plate thickness $t_1$ of the grommet 72, i.e., $t_2 > t_1$. This height difference is a distance within which the base 10 is to be deformed by bending.

When the metal gasket 70 is clamped between the cylinder and the cylinder head, the plate thickness of the portion where the grommet 72 is attached functions as a stopper and prevents the gasket 70 from being pressed in excess of the thickness. On the other hand, portions which are close to clamping bolts are pressed by strong surface pressure to the overall thickness of the base 10, the primers 41 and the sealing materials 42. The surface pressure generating materials 73a and 73b which are located between the stopper and the bolts are deformed in the gap between the clamp surfaces and the deformed surface pressure generating materials 73a and 73b cause the base 10 to be bent. Attachment of the grommet 72 to the base 10 also improves the durability of the metal gasket 70.

Figure 20:
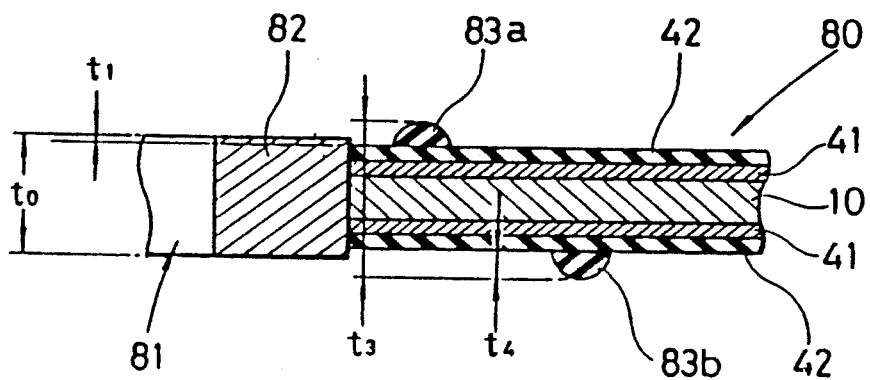
FIG. 20 is a sectional view showing Embodiment 3-5 in which a fire ring is provided.

FIG. 20 shows Embodiment 3-5 in which a fire ring 82 is incorporated into a metal gasket 80 in the same way as the above. The fire ring 82 is made of a metal similar to the above-described grommet and has substantially the same function as that of the grommet. The fire ring 82 is attached to the side of the metal gasket 80 which faces a cylinder bore 81. Surface pressure generating materials 83a and 83b are disposed in the same way as the above. The fire ring 82 also serves as a stopper The plate thickness $t_0$ of the fire ring 82 is smaller than the overall height $t_3$ of the base 10, the primers 41, the sealing materials 42 and the surface pressure generating materials 83a and 83b. The height difference at one side is $t_4 > t_1$.

Figure 21:
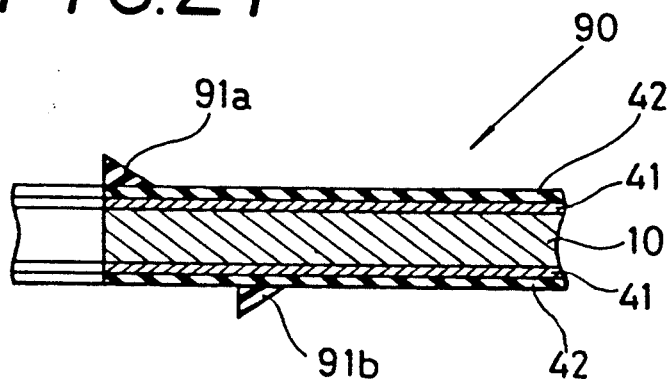
FIG. 21 is a sectional view showing Embodiment 3-6 in which surface pressure generating materials have a different cross-sectional configuration.

FIG. 21 is a sectional view of a metal gasket 90 of Embodiment 3-6, in which the cross-sectional configuration of surface pressure generating materials 91a and 91b is not circular but triangular. The bending stress that acts on the base 10 concentrates more than in the case of surface pressure generating materials having a circular cross-sectional configuration. Therefore, the surface pressure acts somewhat stronger than in the case of surface pressure materials having a circular cross-sectional configuration.

Figure 22:
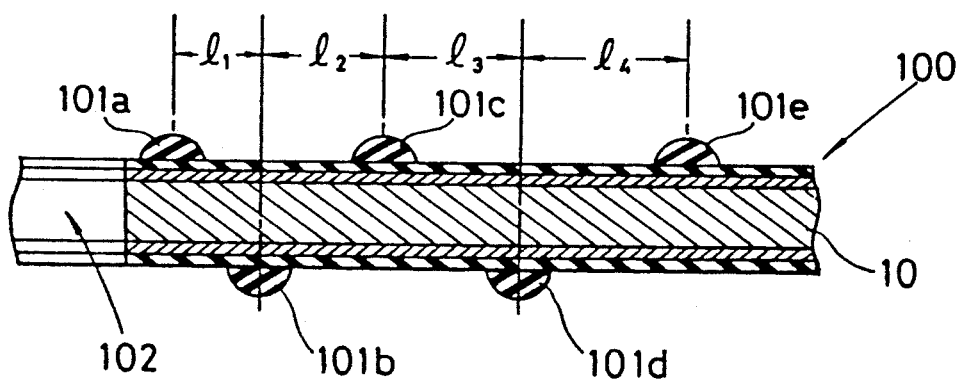
FIG. 22 is a sectional view showing Embodiment 3-7 in which the distances between surface pressure generating materials are varied from each other.

FIG. 22 shows a metal gasket 100 of Embodiment 3-7. A plurality of surface pressure generating materials 101a, 101b, 101c, 101d and 101e are disposed successively in the mentioned order from a bore 102 toward the outer periphery thereof. This embodiment may be employed, for example, in a case where a high-pressure gas is sealed with flanges having a relatively large diameter. It is assumed that the radial distance between the surface pressure generating materials 101a and 101b as viewed from the center of the bore 102 is $\iota_1$, the radial distance between the surface pressure generating materials 101b and 101c is $\iota_2$ and those between the surface pressure generating materials 101c and 101d and the surface pressure generating materials 101d and 101e are $\iota_3$ and $\iota_4$, respectively. The relationship between these distances is preferably set so as to be $\iota_1 < \iota_2 < \iota_3 < \iota_4$. The closer to the outer periphery of the flanges, the longer the distance between each pair of adjacent surface pressure generating materials. The principle of the surface pressure distribution is as described above. This embodiment is most suitable when bolts are located at the outer periphery of the surface pressure generating material 101e.

Figure 23:
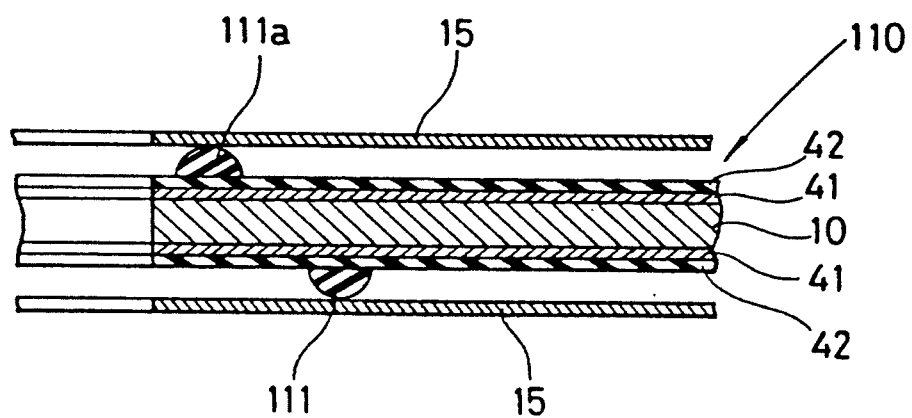
FIG. 23 is a sectional view showing Embodiment 3-8 in which subsidiary plates are provided.

FIG. 23 shows a metal gasket 110 of Embodiment 3-8. A subsidiary plate 15 which is similar to that employed in Embodiment 1-6 is disposed over either one or each of the sides with either one or both of the surface pressure generating materials 111a and 111b interposed therebetween. This embodiment may be used for, for example, sealing of flanges which have large thermal deformation and long dimensions. For instance, in a case where there is a fear of the surface pressure generating materials being scraped off due to the roughly machined surfaces of the flanges when the flanges move, for example, by thermal expansion thereof, a subsidiary plate 15 is provided for one of the sides which is closer to a flange which moves more than the other, or for each side, thereby preventing the surface pressure generating materials 111a and 111b from being scraped off.

Industrial Applicability

The present invention may be applied not only to cylinder gaskets for engines but also to flange joints and cylinder heads of air compressors, for example. In addition, the present invention may be employed not only for gas seal but also for sealing liquids.

What is claimed is:

1. A metal gasket comprising:
   (i) a base (10) which is a metal plate having resilience and heat-resistance;
   (ii) said metal plate being provided with at least one hole (2) extending therethrough between obverse and reverse parallel planar surfaces of said metal plate;
   (iii) first and second rings of surface pressure generating material on the obverse and reverse surfaces, respectively, of said base (10) at the outer periphery of one of said at least one hole (2) to seal said gasket around said hole (2) in such a manner that the widthwise center positions of said first and second surface pressure generating material rings are radially spaced apart from each other;
   (iv) each of said surface pressure generating material rings having a substantially constant height (h) from the corresponding surface;
   (v) each of said surface pressure generating material rings being formed of a non-metal material;
   (vi) roughened surfaces (21) provided at least partially over said obverse and reverse surfaces, respectively, of said base (10) such as to enhance the effectiveness of adhesion of said surface pressure generating material rings; and
   (vii) wherein radial spacing between centers of said first and second said surface pressure generating material rings on the obverse and reverse surfaces of said base (10) are proportioned in accordance with the distance from the position of a clamping pressure generating means (3) such that counter-forces to the clamping pressure applied to said base (10) will become uniform.

2. A metal gasket according to claim 1, wherein said surface pressure generating material has a surface comprising in combination a relatively rigid surface pressure generating material (3) mainly for preventing damage due to heat from a combustion chamber and a relatively soft surface pressure generating material (31) mainly for deforming said base (10).

3. A metal gasket according to claim 1, wherein a rigid surface pressure generating material (30) is attached to said base (10) and a soft surface pressure generating material (31) is applied over said rigid surface pressure generating material (3) to define a two-layer laminated structure.

4. A metal gasket according to claim 1, wherein a subsidiary plate (15) which has a lower hardness than that of said base (10) is provided on at least one of said planar surfaces.

5. A metal gasket according to claim 1, wherein said base (1) is provided with a partial bent portion, which is provided with rigid surface pressure generating material (30) having a height (T) greater than step (t) defined by the bent portion and a soft surface pressure generating material (31) is provided at a side of said rigid surface pressure generating material (30).

6. A metal gasket according to claim 1, wherein each of said first and said second sealing members are located a distance from a perimeter edge of said one of said at least one hole; and wherein each of said obverse and reverse surfaces of said metal plate has only one such sealing member surrounding only said one of said at least one hole.

7. A metal gasket according to claim 6, wherein said hole is substantially circular, said first sealing member is substantially circular and concentric with said hole, and said second sealing member varies radially in accordance with the distance from the position of a clamping pressure generating means.

8. A metal gasket according to claim 1, wherein said non-metal material is selected from the group consisting of a rubber and a resin.

9. A metal gasket according to claim 7, wherein each of said sealing members has a cross-section which narrows in width from the metal plate to an outer-most surface of the sealing member which forms a contact surface of the sealing member.

10. A metal gasket according to claim 8, wherein each of said sealing members has a semi-circular cross section.

11. A metal gasket comprising:
    (i) a base (10) which is a metal plate having resilience and heat-resistance;
    (ii) said metal plate being provided with at least one hole (2) extending therethrough between obverse and reverse parallel planar surfaces of said metal plate;
    (iii) first and second rings of surface pressure generating material on the obverse and reverse surfaces, respectively, of said base (10) at the outer periphery of one of said at least one hole (2) to seal said gasket around said hole (2) in such a manner that the widthwise center positions of said first and second surface pressure generating material rings are radially spaced apart from each other;
    (iv) each of said surface pressure generating material rings having a height (h) from the corresponding surface;
    (v) each of said surface pressure generating material rings being formed of a non-metal material;
    (vi) roughened surfaces (21) provided at least partially over said obverse and reverse surfaces, respectively, of said base (10) such as to enhance the effectiveness of adhesion of said surface pressure generating material rings; and
    (vii) wherein said surface pressure generating material rings have a height (h) from the corresponding surfaces that is varied proportionally in accordance with the distance from the position of a clamping pressure generating means so that the counter-forces to the clamping pressures applied from the obverse and reverse surfaces of said base (10) will become uniform.

12. A metal gasket according to claim 11, wherein each of said first and said second sealing members are located a distance from a perimeter edge of said one of said at least one hole; and wherein each of said obverse and reverse surfaces of said metal plate has only one such sealing member surrounding only said one of said at least one hole.

13. A metal gasket according to claim 12, wherein said hole is substantially circular, said first and second sealing members are substantially circular and concentric with said hole.

14. A metal gasket according to claim 11, wherein said first and said second sealing members are limited to one per hole per each of the surfaces, and wherein said sealing members are also spaced from a perimeter edge of the respective hole.

* * * * *